United States Patent
Chavez

(10) Patent No.: US 10,148,314 B1
(45) Date of Patent: Dec. 4, 2018

(54) EFFICIENT TECHNIQUE FOR COHERENT MULTICARRIER CORRELATION

(71) Applicant: Rockwell Collins, Inc., Cedar Rapids, IA (US)

(72) Inventor: Carlos J. Chavez, Marion, IA (US)

(73) Assignee: ROCKWELL COLLINS, INC., Cedar Rapids, IA (US)

( * ) Notice: Subject to any disclaimer, the term of this patent is extended or adjusted under 35 U.S.C. 154(b) by 113 days.

(21) Appl. No.: 15/406,575

(22) Filed: Jan. 13, 2017

(51) Int. Cl.
*H04B 1/709* (2011.01)
*H04L 5/00* (2006.01)
*H04B 1/713* (2011.01)

(52) U.S. Cl.
CPC ............ *H04B 1/709* (2013.01); *H04B 1/713* (2013.01); *H04L 5/0007* (2013.01)

(58) Field of Classification Search
CPC ........ H04B 1/709; H04B 1/713; H04L 5/0007
See application file for complete search history.

(56) References Cited

U.S. PATENT DOCUMENTS

| 9,325,550 B1* | 4/2016 | Chavez ................. G01S 5/0215 |
| 2012/0038508 A1* | 2/2012 | Mizuochi ................ G01S 19/26 342/357.23 |

\* cited by examiner

*Primary Examiner* — Michelle M Koeth
(74) *Attorney, Agent, or Firm* — Donna P. Suchy; Daniel M. Barbieri

(57) ABSTRACT

System and methods for generating and employing coherent multicarrier correlation can include receiving, from a transmitter, a plurality of radio frequency (RF) signals associated with a respective plurality of nominal carrier components. A processing circuitry can remove from each received RF signal the respective nominal carrier component to generate a corresponding baseband signal. The processing circuitry can generate, for each baseband signal, a respective correlation signal using the baseband signal and a reference signal. The processing circuitry can incorporate, to each correlation signal, the respective nominal carrier component of the RF signal associated with that correlation signal to generate a respective single-carrier correlation signal. The processing circuitry can aggregate the single-carrier correlation signals to generate a multi-carrier correlation signal. The processing circuitry can determine one or more attributes of the transmitter or the received RF signals based on the generated multi-carrier correlation signal.

20 Claims, 3 Drawing Sheets

EFFICIENT TECHNIQUE FOR COHERENT MULTICARRIER CORRELATION

BACKGROUND

Position, navigation, and timing (PNT) systems operate by estimating parameters such as time-of-arrival (TOA) and direction-of-arrival (DOA) of received signals. Such parameters can be estimated using cross-correlation between separate signals. For instance, the global maximum of a cross-correlation function of two signals substantially similar in shape can be indicative of the relative time delay between the two signals. Also, for multipath signals, local maxima of the cross-correlation function can be indicative of secondary communication paths.

The use of correlation functions between signals to estimate signal parameters can suffer accuracy degradation especially when the signals are associated with a relatively smooth autocorrelation function or multipaths that are not far enough apart. For instance, for a relatively smooth autocorrelation function, errors in localizing respective peaks can increase due to noise, channel distortion, or computational errors. Time localization of sharp peaks can be more robust in the presence of noise, or other distortion factors. Furthermore, multipaths that are separated by short relative time delays translate into peaks that are close to one another in the correlation function. The proximity of such peaks makes it difficult to reliably and accurately distinguish between them.

Methods using correlation functions can be, in some cases, computationally costly. The computation of a correlation function involves a larger number of multiplications. The number of multiplications increases as the number of samples in the correlated signals increase. In particular, while correlation methods perform better with wideband signals, the computational complexity for such signals can be relatively high, for example, compared to narrow band signals.

SUMMARY

In one aspect, the inventive concepts disclosed herein are directed to a system including a receiver and circuitry. The receiver can be configured to receive a plurality of radio frequency (RF) signals from a transmitter. Each RF signal can incorporate a respective nominal carrier component. The circuitry can implement one or more carrier removal components configured to remove from each received RF signal the respective nominal carrier component to generate a respective baseband signal. The circuitry can implement a baseband processing component configured to generate, for each baseband signal, a respective correlation signal using the baseband signal and a reference signal. The circuitry can implement one or more carrier restoration components configured to incorporate to each correlation signal the respective nominal carrier component of the RF signal associated with that correlation signal, to generate a respective single-carrier correlation signal. The circuitry can implement an integration component configured to aggregate the single-carrier correlation signals to generate a multi-carrier correlation signal. The circuitry can also implement an estimation component configured to determine one or more attributes of the transmitter or the received RF signals based on the generated multi-carrier correlation signal.

The one or more attributes can include a time of arrival associated with the received RF signals, an angle of arrival associated with the received RF signals, or a combination thereof. The baseband processing component can be configured to downsample the generated baseband signals. The baseband processing component can be configured to upsample the generated correlation signals. The RF signals can include orthogonal frequency division multiplexing (OFDM) signals. The RF signals can include frequency hopping spread spectrum (FHSS) signals. The baseband processing component can be configured to time shift the generated correlation signals based on time delays between respective FHSS signals.

The one or more carrier removal components can be configured to remove a nominal carrier component by frequency-mixing a received RF signal with a RF oscillation signal to generate the respective baseband signal. The one or more carrier restoration components can be configured to incorporate the nominal carrier component by frequency-mixing the correlation signal associated with the received RF signal with a delayed version of the RF oscillation signal. The integration component can be configured to generate a plurality of frequency shifted versions of at least one single-carrier correlation signal, and generate a plurality of multi-carrier correlation signals based on the plurality of frequency shifted versions of the at least one single-carrier correlation signal. The system can include one or more RF oscillators for generating RF oscillation signals. The RF oscillation signals can be used to remove the nominal carrier components from the received RF signals, incorporate the nominal carrier components to the generated correlation signals, or a combination thereof.

In a further aspect, the inventive concepts disclosed herein are directed to a method that includes a receiving communication device receiving a plurality of radio frequency (RF) signals from a transmitter. Each RF signal can incorporate a respective nominal carrier component. The method can include the receiving communication device removing from each received RF signal the respective nominal carrier component to generate a respective baseband signal. The method can include the receiving communication device generating, for each baseband signal, a respective correlation signal using the baseband signal and a reference signal. The method can include the receiving communication device incorporating, to each correlation signal, the respective nominal carrier component of the RF signal associated with that correlation signal to generate a respective single-carrier correlation signal. The method can include the receiving communication device aggregating the single-carrier correlation signals to generate a multi-carrier correlation signal. The method can also include the receiving communication device determining one or more attributes of the transmitter or the received RF signals based on the generated multi-carrier correlation signal.

The one or more attributes can include a time of arrival associated with the received RF signals, an angle of arrival associated with the received RF signals, or a combination thereof. The method can further include the receiving communication device downsampling the generated baseband signals. The method can further include the receiving communication device upsampling the generated correlation signals. The RF signals can include orthogonal frequency division multiplexing (OFDM) signals. The RF signals can include frequency hopping spread spectrum (FHSS) signals. The method can also include the receiving communication device time shifting the generated correlation signals based on time delays between respective FHSS signals.

The method can also include the receiving communication device removing a nominal carrier component by frequency-mixing a received RF signal with a RF oscillation signal to generate the respective baseband signal, and incorporating the nominal carrier component by frequency-mixing the correlation signal associated with the received RF signal with a delayed version of the RF oscillation signal. The method can also include the receiving communication device generating a plurality of frequency shifted versions of at least one single-carrier correlation signal, and generating a plurality of multicarrier correlation signals based on the plurality of frequency shifted versions of the at least one single-carrier correlation signal.

In a further aspect, the inventive concepts disclosed herein are directed to a non-transitory computer-readable medium including computer code instructions stored thereon. The computer code instructions, when executed by one or more processors, can cause the one or more processors to obtain a plurality of radio frequency (RF) signals received from a transmitter. Each RF signal can incorporate a respective nominal carrier component. The one or more processors can remove from each received RF signal the respective nominal carrier component to generate a respective baseband signal. The one or more processors can generate, for each baseband signal, a respective correlation signal using the baseband signal and a reference signal. The one or more processors can incorporate, to each correlation signal, the respective nominal carrier component of the RF signal associated with that correlation signal to generate a respective single-carrier correlation signal. The one or more processors can aggregate the single carrier correlation signals to generate a multi-carrier correlation signal. The one or more processors can determine one or more attributes of the transmitter or the received RF signals based on the generated multi-carrier correlation signal.

BRIEF DESCRIPTION OF THE DRAWINGS

Implementations of the inventive concepts disclosed herein may be better understood when consideration is given to the following detailed description thereof. Such description makes reference to the included drawings, which are not necessarily to scale, and in which some features may be exaggerated and some features may be omitted or may be represented schematically in the interest of clarity. Like reference numerals in the drawings may represent and refer to the same or similar element, feature, or function. In the drawings.

Figure 1:
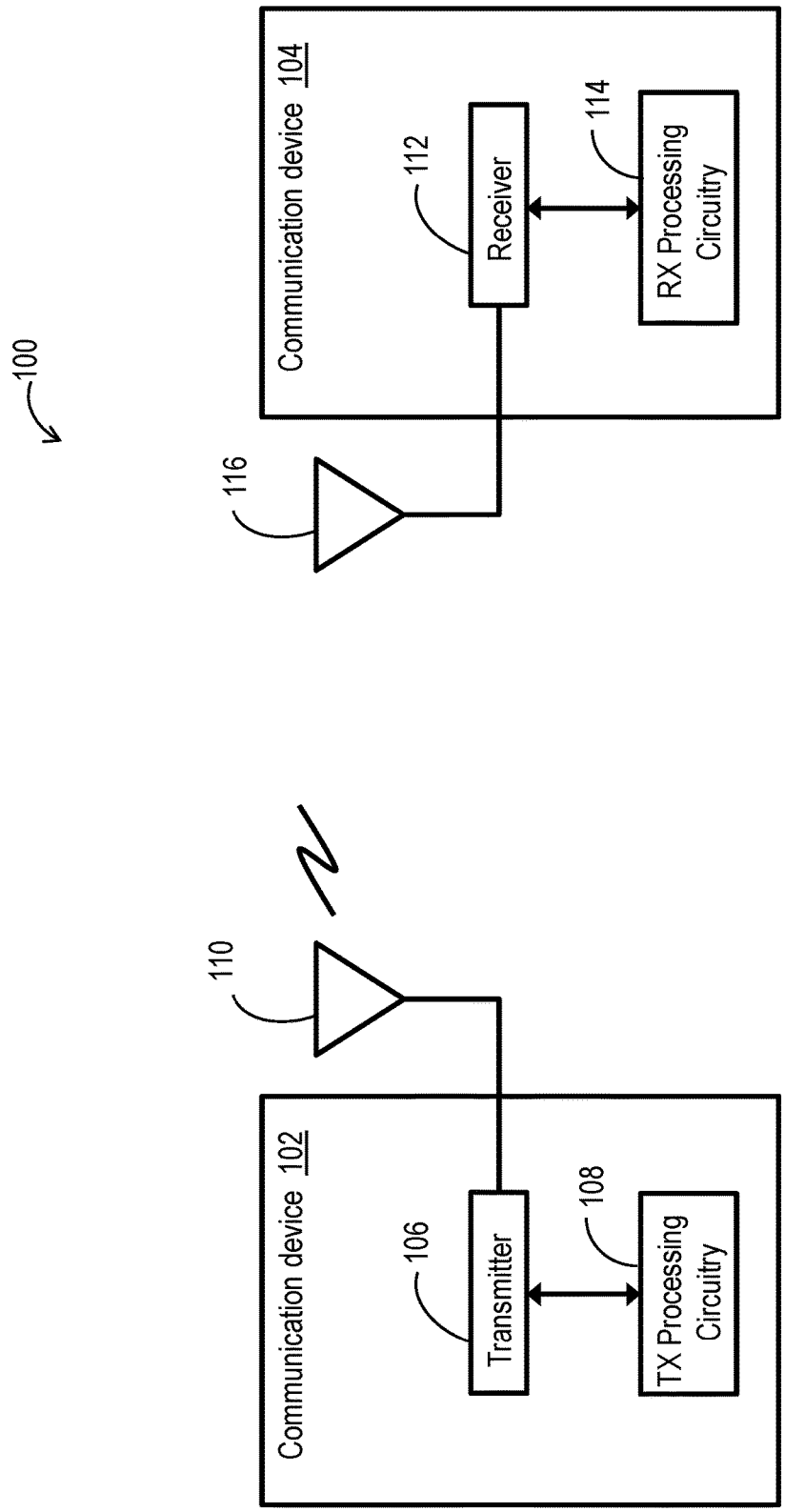
FIG. 1 shows a diagram illustrating a an example embodiment of a communication environment that employs coherent multicarrier correlation, according to inventive concepts of this disclosure.

The details of various embodiments of the methods and systems are set forth in the accompanying drawings and the description below.

DETAILED DESCRIPTION

Before describing in detail embodiments of the inventive concepts disclosed herein, it should be observed that the inventive concepts disclosed herein include, but are not limited to a novel structural combination of components and circuits, and not to the particular detailed configurations thereof. Accordingly, the structure, methods, functions, control and arrangement of components and circuits have, for the most part, been illustrated in the drawings by readily understandable block representations and schematic diagrams, in order not to obscure the disclosure with structural details which will be readily apparent to those skilled in the art, having the benefit of the description herein. Further, the inventive concepts disclosed herein are not limited to the particular embodiments depicted in the diagrams provided in this disclosure, but should be construed in accordance with the language in the claims.

Many electronic systems such as multicarrier communication systems, multi-carrier radar systems, or position, navigation, and timing (PNT) systems may involve estimating signal or system parameters based on correlation between two or more signals. The system or signal parameters can include a time-of-arrival (TOA) of a given signal, relative time delay(s) between two or more signals, a direction-of-arrival (DOA) parameter for given signal, or parameters associated with (or characterizing) multiple communications paths. A communication device (or computing device) can estimate the system or signal parameter by performing (or computing) cross-correlation(s) between two or more signals (e.g., between a received signal and a reference signal). For instance, the time location of a peak in a cross-correlation function corresponding to two separate but substantially similar signals (e.g., one signal is a delayed version of the other) can be indicative of the relative time delay between the two signals. Considering that the energy spectral density of a given signal represents the Fourier transform of the autocorrelation function of that signal, the larger the frequency band of a signal the narrower the respective autocorrelation function in the time domain. The narrower the autocorrelation function in the time domain, the higher can be the resolution or accuracy of estimated relative time delays.

Improved performance in estimating signal or system parameters, particularly in a multipath environment, can be achieved via relatively wide-band signals. In multicarrier signaling (or multi-carrier communication), increased bandwidth of power spectral density can be achieved even when the exchanged baseband signal(s) has a relatively narrow frequency band. Multi-carrier signaling includes transmitting a baseband signal using multiple nominal carrier waves associated with multiple nominal carrier frequencies. Multicarrier signaling can be carried out using, for example, orthogonal frequency-division multiplexing (OFDM) or frequency hopping. When using OFDM, a transmitter can simultaneously transmit multiple carrier waves carrying a given baseband signal. When using frequency hopping, the transmitter can alternate (or hop) between various carrier frequencies to transmit multiple carrier waves that carry a given baseband signal one after another. Each carrier wave can be associated with a respective carrier frequency band (e.g., centered at the carrier frequency of that carrier wave). Considering the aggregate bandwidth representing the carrier frequency bands associated with the multiple carrier waves, the overall multicarrier bandwidth is much larger than the bandwidth of any single carrier wave (or carrier signal).

Systems and methods described herein employ efficient techniques for coherent multicarrier correlation to determine (or estimate) parameters associated with a communication system or with received signals. Coherent multicarrier correlation can be achieved, for example, when the phase relationships between the multiple carriers (or multiple carrier waves) are known. The techniques for coherent multicarrier correlation described herein allow a communication device to achieve the benefits of a narrow correlation function corresponding to a relatively wide multicarrier bandwidth (e.g., compared to a single carrier bandwidth) at a reduced computational cost. For instance, the techniques for coherent multicarrier correlation described herein can lead to a reduction in the computational complexity associated with estimating relative time delays, TOAs or other parameters by orders of magnitude while providing relatively high estimation accuracy (e.g., compared to techniques for single carrier correlation) even in the presence of short-delay multi-paths.

Referring now to the drawings, FIG. 1 shows a diagram illustrating an embodiment of a communication environment 100 that can employ coherent multicarrier correlation, according to inventive concepts of this disclosure. The communication environment 100 includes a first communication device 102 acting as a transmitting device and a second communication device 104 acting as a receiving device. The communication device 102 can include a transmitter 106, a transmit (TX) processing circuitry 108, and an antenna 110. The communication device 104 can include a receiver 112, a receive (RX) processing circuitry 114, and an antenna 116.

The communication device 102 can be configured to transmit multicarrier signals. The TX processing circuitry 108 can include a multicarrier modulator. The multicarrier modulator may include a plurality of single carrier modulators arranged in parallel. Each single carrier modulator can include a filter (e.g., a low-pass filter or a bandpass filter) and a frequency mixer for frequency shifting an input signal to generate a respective radio frequency (RF) signal centered, in the frequency domain, at a nominal carrier frequency specific to that single carrier modulator. For example, an N-carrier modulator, where N is an integer number, can include N frequency mixers associated with the nominal carrier frequencies $f_0, f_1, \ldots, f_{N-1}$, respectively. The TX processing circuitry 108 can include one or processors such as a microprocessor or a specialized microprocessor, e.g., a digital signal processor (DSP), an electric or electronic circuit, a memory, or a combination thereof.

In some instances, such as in the case of orthogonal frequency division multiplexing (OFDM), some embodiments of the multicarrier modulator may be configured to generate multiple single carrier RF signals for simultaneous transmission. The plurality of frequency mixers can receive a common baseband (or intermediate frequency (IF) band) signal, or a filtered version of the baseband or IF band signal, as input and generate a plurality of corresponding single carrier modulated RF signals. The generated single carrier modulated RF signals can carry the same data—information represented by the input signal—at various nominal carrier frequencies (e.g., $f_0, f_1, \ldots, f_{N-1}$). The TX processing circuitry 108 may include a serial-to-parallel converter for segmenting an input baseband signal into a plurality of input signal segments. Each of the input signal segments can be carrier modulated using a respective single carrier modulator of the plurality of single carrier modulators. Each of the output RF signals, generated by the plurality of single carrier modulators and corresponding to the plurality of input signal segments, can carry separate data—information associated with each input signal segment. The TX processing circuitry 108 may include an aggregator for aggregating, combining, merging or superimposing (e.g., in time domain) the plurality of single carrier modulated RF signals to generate a multicarrier RF signal.

In some other instances, the multicarrier modulator may be configured to apply frequency hopping—alternating or switching according to a pattern over time between the nominal carrier frequencies or the single carrier modulators—to generate a plurality of single carrier RF signals that are transmitted in sequence relative to one another. For example, the multicarrier modulator may use the nominal carrier frequency $f_0$ during a first time interval to generate a first single carrier signal, use the nominal carrier frequency $f_1$ during a second time interval subsequent to the first time interval to generate a second signal carrier signal, use the nominal carrier frequency $f_2$ during a third time interval subsequent to the second time interval to generate a third signal carrier signal, and so on and so forth. The generated single carrier signals can be transmitted by the transmitter 106 in the same chronological order as generated by the multicarrier modulator. The plurality of single carrier signals transmitted one after the other may be referred to herein as frequency hopping spread spectrum (FHSS) signals.

The transmitter 106 may include a digital-to-analog converter (DAC) for converting digital RF signals generated by the TX processing circuitry 108, to analog RF signals. The transmitter 106 may include a power amplifier for amplifying the RF signals. The transmitter may include, or may be communicatively coupled to, the antenna 110. The antenna 110 can be a single antenna, a plurality of antennas, or an antenna array. The antenna 110 converts the RF signals into RF waves that can propagate in the air, for example, between the communication device 102 and the communication device 104. The communication device 102 can be associated with, or integrated within, a satellite, a wireless communication base station, a radar system, an aircraft, a drone, a motor vehicle, or a mobile device, as non-limiting examples.

The communication device 104 can receive RF signals transmitted by the communication device 102. The communication device 102 can be associated with, or integrated within, a mobile device, a global positioning system (GPS) device, an aircraft, a drone, a motor vehicle, a wireless communication base station, a radar system, or a satellite, by way of illustration. The antenna 116 can include a single antenna, multiple antennas, or an antenna array. The antenna 116 can convert RF waves transmitted by the communication device 102 to analog RF electrical signals. The antenna 116 can be communicatively coupled to, or a component of, the receiver 112. The antenna 116 can provide the analog RF signals to the receiver 112.

The receiver 112 can include a power amplifier to amplify RF signals received from the antenna 116. The receiver can also include an analog-to-digital converter (ADC) for sampling analog RF signals received from the antenna to generate corresponding digital RF signals. The ADC may sample received RF signals at a sampling rate defined based on frequency bands of the plurality of single carrier modulated signals transmitted by the communication device 102. For example, the ADC can use a single sampling rate for all received single carrier modulated signals. The sampling rate can be defined based on the highest frequency associated with the single carrier modulated signals received from the communication device 102. The receiver may further include one or more analog or digital filters. The receiver 112 can provide the digital RF signals to the RX processing circuitry 114.

The RX processing circuitry 114 can include one or more processors such as a microprocessor or a specialized microprocessor (e.g., a digital signal processor (DSP)), an electric or electronic circuit, a memory, or a combination thereof.

The RX circuitry 114 can receive digital RF signals from the receiver 112, and generate corresponding multicarrier coherent correlation signal(s). The RX processing circuitry and respective components are discussed in further details below with regard to FIG. 2.

Figure 2:
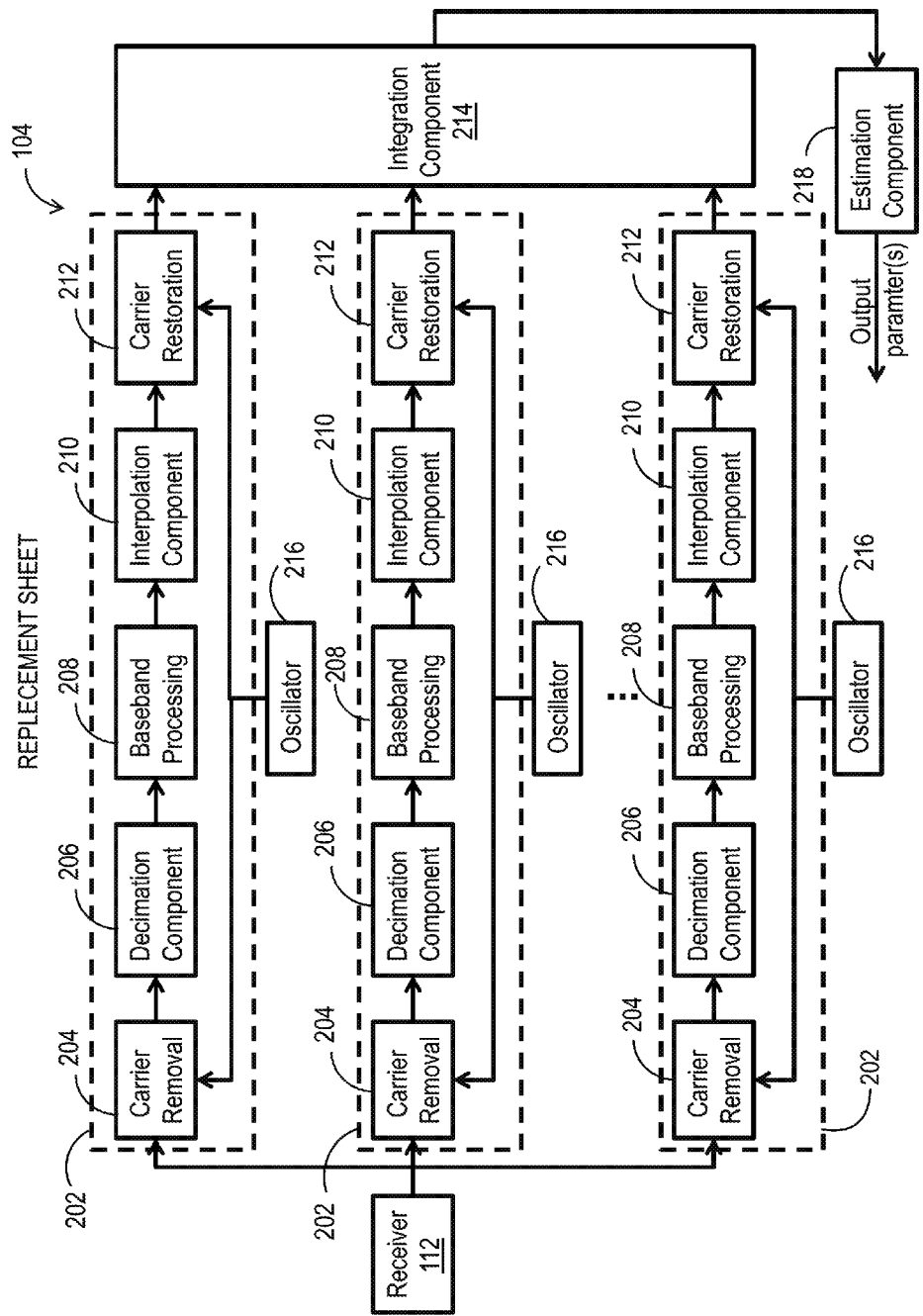
FIG. 2 shows a block diagram illustrating an example embodiment of a communication device using coherent multicarrier modulation to estimate signal attributes, according to inventive concepts of this disclosure.

Referring now to FIG. 2, a block diagram illustrating an example embodiment of the communication device 104 for determining and employing coherent multicarrier correlation is shown. The communication device 104 can include the receiver 112 and a plurality of processing cascades 202 for processing separate single carrier modulated signals. Each processing cascade can include a carrier removal component 204, a decimation component 206, a baseband processing component 208, an interpolation component 210 and/or a carrier restoration component 212. The communication device 104 can include an integration component 214, a plurality of RF oscillators 216, and/or an estimation component 218.

Each processing cascade 202 can be configured to process single carrier modulated RF signals associated with a respective nominal carrier frequency. For instance, the first or top processing cascade 202 in FIG. 2 can process single carrier modulated RF signals associated with the nominal carrier frequency $f_0$, the second or next processing cascade 202 can process single carrier modulated RF signals associated with the nominal carrier frequency $f_1$, and so on. All the processing cascades 202 may receive the same RF signal from the receiver signal 112, or different RF signals. The RF signal provided by the receiver 112 may be a multicarrier modulated signal that represents an aggregation of a plurality of single carrier modulated signals (e.g., if OFDM is used at the communication device 102), or a sequence of single carrier modulated signals (e.g., if frequency hopping is used at the communication device 102).

Each processing cascade 202 may include a bandpass filter (not shown in FIG. 2), for example between the respective carrier removal component 204 and the receiver 112, for passing single carrier modulated RF signals to be processed by that processing cascade. The bandpass filter may be centered at the nominal carrier frequency associated with the respective processing cascade 202. For instance, at the first or top processing cascade 202, the bandpass filter can be centered at the nominal carrier frequency $f_0$, and can have a pass band equal to or including the bandwidth of the single carrier modulated RF signals associated with the nominal carrier frequency $f_0$. At the second processing cascade 202, the bandpass filter can be centered at the nominal carrier frequency $f_1$, and can have a pass band equal to or including the bandwidth of the single carrier modulated RF signals associated with the nominal carrier frequency $f_1$. In each processing cascade 202, the respective bandpass filter can pass single carrier modulated RF signals associated with the respective nominal carrier frequency and can filter out single carrier modulated RF signals associated with the other nominal carrier frequencies. For each processing cascade 202, the respective bandpass filter may be a component of the respective carrier removal component 204.

Each carrier removal component 204, within a given processing cascade, can include a frequency mixer and a low-pass filter. The carrier removal component 204 can remove a nominal carrier component from each single carrier modulated RF signal that passes through the bandpass filter ahead of that carrier removal component 204. As used herein, the nominal carrier component can refer to the nominal carrier frequency (e.g., $f_0, f_1, \ldots$ or $f_{N-1}$) or the nominal carrier signal (e.g., $A\cos(2\pi f_0 t), A\cos(2\pi f_1 t), \ldots$ or $A\cos(2\pi f_{N-1} t)$, where A is a real number) associated with the single carrier modulated RF signal processed by the carrier removal component 204. The frequency mixer can multiply the single carrier modulated RF signal with a signal received from the RF oscillator 216 (or a complex conjugate of a signal received from the RF oscillator 216) and corresponding to the respective nominal carrier signal (e.g., $\cos(2\pi f_0 t), \cos(2\pi f_1 t), \ldots$ or $\cos(2\pi f_{N-1} t)$). The output signal of the frequency mixer includes bandpass components and low-pass frequency components. The low-pass filter filters the RF signal output from the frequency mixer to retain the baseband (or low-pass) component of the signal and can filter out any bandpass components. The output of the low-pass filter corresponds to a delayed version of the transmitted baseband signal (the delayed version may also be noisy or distorted due to, for example, channel noise, channel distortion, or angle of arrival), in some embodiments.

The decimation component 206 can downsample the baseband signal output from the carrier removal component 204. Given that receiver 112 can employ a sampling rate determined based on the bandwidth of the plurality of single carrier modulated RF signals received from the communication device 102, the baseband signal output or produced by the carrier removal component 204 can be oversampled. The decimation component 206 can substantially reduce the sampling rate of the baseband signal based on the difference between the bandwidth of the baseband signal and the bandwidth of the single carrier modulated signals. For example, the decimation component 206 can reduce the number of samples of the baseband signal output by/from the carrier removal component 204, by one order of magnitude (a factor of ten or more), two orders of magnitude (a factor of hundred or more), or three orders of magnitude (a factor of thousand or more), for example. The downsampling of the baseband signal by the decimation component 206 can lead to a substantial reduction in the computational complexity of the baseband processing component 208.

The baseband processing component 208 can compute, or generate, a correlation signal (or cross-correlation signal) using the baseband signal and a reference signal. The reference signal can include a non-distorted version of the baseband signal used at the communication device 102, or a baseband signal generated based on a single carrier modulated signal received from another communication device (other than the communication device 102). Since computing the correlation signal can involve a plurality of multiplication operations for each sample of the baseband signal, the downsampling of the baseband signal by the decimation component 206 can result in a substantial reduction (e.g., by one order of magnitude, two orders of magnitude, three orders of magnitude, or more) in the number of multiplication operations performed when generating the correlation signal. The baseband processing components 208 associated with the processing cascades 202 may remove phase offsets, applied by the computing device 102 to the single carrier modulated signals, by multiplying the respective baseband signals or the respective generated correlation signals by distinct phase terms. Removing the phase offsets allows for constructive aggregation of separate single carrier (modulated) correlation signals at the integration component 214 to generate coherent multicarrier (modulated) correlation.

In the case where the communication device 102 employs frequency hopping, the baseband processing components 208 can apply time shifts (or time delays) to respective baseband signals or respective generated correlation signals to remove time delays introduced by frequency hopping between separate single carrier modulated RF signals. For instance, the baseband processing components 208 may use transmission time delays between successive transmissions of the single carrier modulated RF signals at the communication device 102 due to frequency hopping, to determine the time shift to be applied to each baseband signal or each correlation signal. By applying the time shifts to the baseband signals (e.g., before computing the correlation signals) or to the correlation signals, the baseband processing components 208 can align the generated correlation signal in time (e.g., as if the corresponding single carrier modulated RF signals were transmitted simultaneously by the communication device 102). The baseband processing components 208 may also apply time delay and phase adjustments to the generated correlation signals for calibration purposes. This can compensate for non-ideal delay and phase characteristics of the receiver 112 from frequency to frequency. The baseband processing components 208 may also remove estimated nominal carrier frequency errors prior to other baseband processing and restore the same estimated nominal carrier frequency errors subsequent to other baseband processing. This can improve performance in the presence of frequency reference offset or Doppler shift due to motion. The nominal carrier frequency error estimates can be supplied by, for instance, a demodulation process working on the received signal (not shown) or some other source.

Each processing cascade 202 can include a respective interpolation component (or interpolator) 210. Within each processing cascade 202, the interpolation component 210 can interpolate or upsample the respective generated correlation signal to achieve a sampling rate for the correlation signal that satisfies the Nyquist criterion for the cumulative bandwidth of the plurality of single carrier modulated RF signals or the bandwidth for the multicarrier modulated RF signal(s). The upsampling can increase the sampling rate of each generated correlation signal by for example one order of magnitude, two orders of magnitude, three orders of magnitude, or more. The upsampling performed at the interpolation components 210 can avoid or prevent signal aliasing when nominal carriers components are incorporated into the correlation signals.

Each processing cascade 202 can include a respective carrier restoration component 212 configured to incorporate to the respective generated correlation signal the nominal carrier component of the single carrier modulated RF signal associated with that processing cascade (or with that correlation signal) to generate a respective single-carrier correlation signal. The carrier restoration component 212 can include a frequency mixer and/or a bandpass filter. The frequency mixer can multiply (in time domain) the respective generated correlation signal with a delayed version of the signal generated by the RF oscillator 216 (or a complex conjugate of a delayed version of the signal generated by the RF oscillator 216). The signal generated by the RF oscillator 216 has a nominal frequency equal to (or substantially equal to, considering oscillator error and/or nominal carrier frequency estimation error for instance) the nominal carrier frequency associated with the respective processing cascade 202. The output signal of the frequency mixer can include a baseband frequency component and bandpass frequency components centered at the nominal carrier frequency associated with the respective processing cascade 202 and at the additive inverse of that nominal carrier frequency.

The bandpass filter of the carrier restoration component 212 can be centered at the nominal carrier frequency associated with the respective processing cascade 202, and at the additive inverse of that nominal carrier frequency. The bandpass filter can pass the bandpass components of the output signal of the frequency mixer while removing the respective baseband frequency component. The output of the bandpass filter (or the output of the carrier restoration component 212 can be viewed as a single carrier (or single carrier modulated) correlation signal. For example, if the top processing cascade 202 in FIG. 2 is associated with the nominal carrier frequency $f_0$, the output signal of the carrier restoration component 212 can be viewed as a single carrier modulated correlation signal with a respective carrier frequency equal to $f_0$. In a way, the carrier component removed by the carrier removal component 204 may be viewed as restored to the corresponding correlation signal by the carrier restoration component 212 with some time delay.

The delayed version of the signal generated by the RF oscillator 216, used by the frequency mixer of the carrier restoration component 212, can be generated by applying a time shift to the signal generated by the RF oscillator 216. The time shift can account for time delay corresponding to the processing time between the time instance at which the oscillator generated signal is used (multiplied with the respective single carrier RF signal) at the carrier removal component 204, and the time instance at which the delayed version of the oscillator generated signal is used by the carrier restoration component 212. Accounting for the processing delay allows for preserving the relative phases and coherence between the various single carrier (modulated) correlation signals associated with the plurality of processing cascades 202.

The RF oscillator 216 associated with each processing cascade 202 can be configured to generate a signal oscillating at the respective nominal carrier frequency. For example, if the top or first processing cascade 202 in FIG. 2 is associated with the nominal carrier frequency $f_0$, the corresponding RF oscillator 216 can generate a signal oscillating at frequency $f_0$, such as $\cos(2\pi f_0 t)$, $\sin(2\pi f_0 t)$, or $e^{-2\pi f_0 t}$. If the RF oscillator generated signal is a complex signal, then the complex conjugate of the generated signal or a delayed version thereof can be used by the carrier removal component 204 or the carrier restoration component 212.

The integration component 214 can aggregate, combine, merge or superimpose the plurality of single carrier (modulation) correlation signals output from the plurality of processing cascades 202, to generate a multicarrier (or multicarrier modulated) correlation signal. Each time sample of the multicarrier (modulated) correlation signal can be equal to the sum or average of corresponding samples of the plurality of single carrier (modulated) correlation signals. The integration component 214 may generate a plurality of multicarrier (modulated) correlation signals. The integration component 214 may generate, for each single carrier (modulated) correlation, multiple respective versions at various frequency offsets to account for potential Doppler shift (e.g., due to different moving speeds associated with the communication device 102 and 104) or potential frequency offsets induced by the RF oscillators 216. The integration component 214 may generate a plurality of multicarrier (modulated) correlation signals by aggregating different combinations of the generated versions of the single carrier correlation signals. Each combination can include a single version for each single carrier correlation signal.

The estimation component 218 can determine one or more attributes (or parameters) of the plurality of received single carrier RF signals (associated with multiple nominal carrier frequencies), the communication device 102, or the communication device 104, based on at least one generated multicarrier correlation signal. Considering a single multicarrier (modulated) correlation signal, the estimation model can determine (or estimate) a time-of-arrival (TOA) associated with at least one of the received single carrier modulated RF signals, and angle-of-arrival (AOA) or direction associated with at least one of the received single carrier modulated RF signals, a geographic location of the communication device 102, a geographic location of the communication device 104, a speed (or velocity) of the communication device 102, a speed (or velocity) of the communication device 104, multipath characteristics of the received single carrier modulated RF signals (or a respective multicarrier modulated RF signal), or a combination thereof.

The estimation component 218 can determine the TOA (or time delay) associated with at least one of the received single carrier modulated signals based on the time location of the peak (or global maximum) of the magnitude of the multicarrier (modulated) correlation signal. The estimation component 218 can determine the AOA associated with at least one of the received single carrier modulated signals based on (e.g., equal to) the phase of the multicarrier (modulated) correlation signal. Using the TOA and the AOA associated with RF signals received from the communication device 102, the estimation component 218 can determine a geographical location (or relative location from the communication device 104) of the communication device 102. Using TOAs (or relative time delays) or the AOAs associated with RF signals received from multiple transmitting communication devices 102, the estimation component can determine the geographical location or speed of the communication device 104 (e.g., using triangulation). Also, using time locations of global and local maxima in the multicarrier (modulated) correlation signal, the estimation component 218 can determine the relative time delays between different communication paths associated with the received single carrier (modulated) RF signals.

In the case where multiple versions of the multicarrier (modulated) correlation signals are generated (e.g., based on various frequency offsets), the estimation component 218 may determine multiple estimates (e.g., each one based on a respective version of the multicarrier correlation signal) for an attribute or parameter. Each of the baseband signals, the single carrier modulated RF signals, the multicarrier modulated RF signals, the correlation signals, the single carrier (modulated) correlation signals, or the multicarrier (modulated) correlation signal(s) can be a real valued signal or a complex valued signal.

Figure 3:
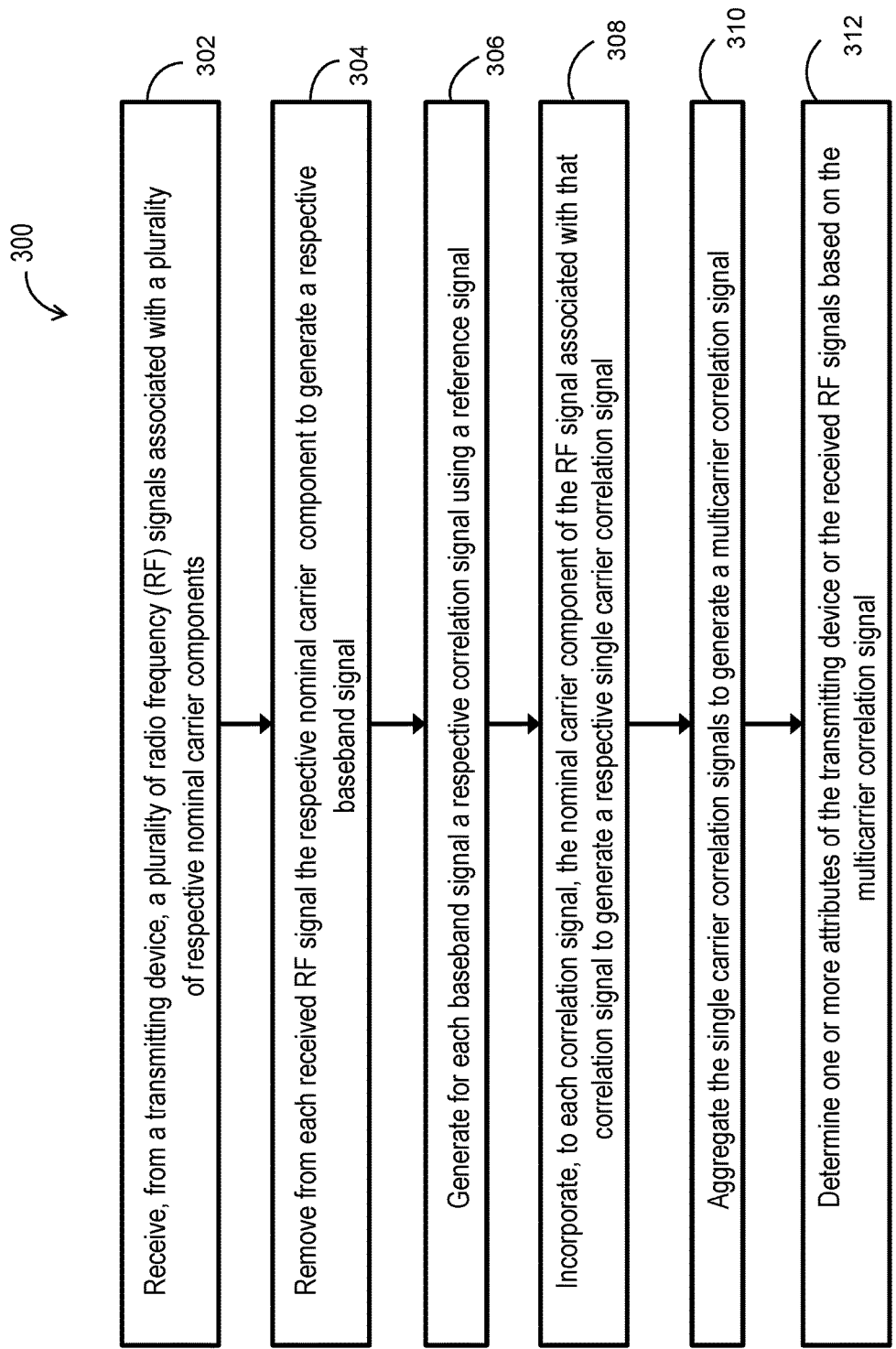
FIG. 3 shows a flowchart illustrating an example embodiment of a method for using coherent multicarrier modulation to estimate signal attributes, according to inventive concepts of this disclosure.

Referring to FIG. 3, a flow chart illustrating one embodiment of a method 300 for generating and using coherent multicarrier correlation to estimate attributes or parameters of received multicarrier signals is shown. The method 300 can include a processing circuitry receiving, from a transmitting device, a plurality of radio frequency (RF) signals associated with a plurality of respective nominal carrier components (step 302). The method 300 can include the processing circuitry removing from each received RF signal the respective nominal carrier component to generate a respective baseband signal (step 304). The method 300 can include the processing circuitry generating, for each baseband signal, a respective correlation signal using a reference signal (step 306). The method 300 can include incorporating, to each correlation signal, the nominal carrier component of the RF signal associated with that correlation signal to generate a respective single-carrier correlation signal (step 308). The method 300 can also include aggregating the single carrier correlation signals to generate a multicarrier correlation signal (step 310), and determining one or more attributes of the transmitting device or the received RF signals based on the multicarrier correlation signal (step 312).

The method 300 can include a processing circuitry receiving, from a transmitting device, a plurality of radio frequency (RF) signals associated with a plurality of respective nominal carrier components (step 302). A transmitting device, such as communication device 102, can transmit multicarrier modulated RF signals, for example, using OFDM or frequency hopping. The processing circuitry can receive the multicarrier modulated RF signals. The processing circuitry can obtain digital versions of the multicarrier modulated RF signals from one or more analog to digital converters.

The method 300 can include the processing circuitry removing from each received RF signal the respective nominal carrier component to generate a respective baseband signal (step 304). The processing circuitry can include a plurality of bandpass filters to separate the multicarrier modulated RF signals into a plurality of single carrier modulated signals, each associated with a respective nominal carrier frequency. The processing circuitry can remove the nominal carrier component (e.g., the nominal carrier signal/wave or the nominal carrier frequency) from each single carrier modulated RF signal by using a respective frequency mixer followed by a low-pass filter, as discussed above with regard to FIG. 2. For each single carrier modulated RF signal, the respective frequency mixer can multiply that single carrier modulated RF signal with a signal oscillating at the corresponding nominal carrier frequency.

The processing circuitry can downsample each generated baseband signal to reduce the respective sampling rates to satisfy the Nyquist criterion for the baseband bandwidth. For example, the cutoff frequency for the baseband signal(s) can be in the range of tens of MHz, whereas the cutoff frequency for the single carrier modulated RF signals can be in the range of 1 to 10 GHz. According to this non-limiting example, the processing circuitry can reduce the sampling rate of the baseband signals by about two orders of magnitude. The reduction in sampling rate can allow for a substantial decrease in the computational complexity of the processing circuitry. Specifically, the processing circuitry can substantially reduce the number of samples of the baseband signals and, therefore, substantially reduce the number of multiplication performed in computing or generating the correlation signal.

The method 300 can include the processing circuitry generating, for each baseband signal, a respective correlation signal using a reference signal (step 306). The processing circuitry can cross-correlate the baseband signal with the reference signal as discussed above with regard to FIG. 2. The processing circuitry may remove phase offsets, applied by the transmitting device to the single carrier modulated signals. For instance, given the values of the phase offsets applied by the transmitting device to the multicarrier modulated signals, the processing circuitry can multiply the respective baseband signals or the respective generated correlation signals by distinct phase terms determined based on the phase offsets. The processing circuitry may also apply time shifts (or time delays) to baseband signals or generated correlation signals to remove time delays induced by frequency hopping between separate single carrier modulated RF signals. By applying the time shifts to the baseband signals (e.g., before computing the correlation signals) or to the correlation signals, the processing circuitry can align the generated correlation signal in time (e.g., as if the corresponding single carrier modulated RF signals were transmitted simultaneously).

The method 300 can include incorporating or "restoring", to each correlation signal, the nominal carrier component of the RF signal associated with that correlation signal to generate a respective single-carrier correlation signal (step 308). As discussed above with regard to the carrier restoration component 212 of FIG. 2, the processing circuitry can employ a frequency mixer and a bandpass filter for each single carrier (modulated) correlation signal to incorporate or restore the respective nominal carrier component. The frequency mixer can use a delayed version of the oscillating signal used with the frequency mixer associated with step 304. The time delay is used to account for any inherent processing delay between the steps 304 and 308, for example.

The method 300 can also include aggregating the single carrier correlation signals to generate a multicarrier correlation signal (step 310). The processing circuitry can upsample or interpolate each single carrier (modulated) correlation signal to increase the respective sampling rates to satisfy the Nyquist criterion for the bandwidth of the multicarrier modulated RF signals. The processing circuitry can sum or average corresponding samples of the upsampled plurality of single carrier correlation signals to compute each corresponding sample of the multicarrier (modulated) correlation signals. In some instances, the processing circuitry can generate a plurality of versions of the upsampled single carrier correlation signals, each associated with a respective frequency offset, to account for potential Doppler shift and/or errors in estimating nominal carrier frequencies.

The method can include the processing circuitry determining one or more attributes of the transmitting device or the received RF signals based on the multicarrier correlation signal (step 312). As discussed above with regard to FIG. 2, the processing circuitry can estimate TOA, AOA, or other attributes or parameters associated with the received RF signals, the transmitting device, or a receiving device including the processing circuitry.

The methods described in this disclosure can be implemented using computer executable instructions stored on a computer-readable medium. The computer executable instructions, when executed by one or more processors, can cause the one or more processors to execute the steps of the methods described in this disclosure. For instance, processes associated with the receiver 112, the processing cascades 202, the integration component 214, and the estimation component 218 can be implemented as computer code instructions that are executable by a microprocessor, a DSP, or a combination thereof.

The construction and arrangement of the systems and methods are described herein as illustrative examples and are not to be construed as limiting. Although only a few embodiments have been described in detail in this disclosure, many modifications are possible (e.g., variations in sizes, dimensions, structures, shapes and proportions of the various elements, values of parameters, mounting arrangements, use of materials, colors, orientations). For example, the position of elements may be reversed or otherwise varied and the nature or number of discrete elements or positions may be altered or varied. Accordingly, all such modifications are intended to be included within the scope of the inventive concepts disclosed herein. The order or sequence of any operational flow or method of operations may be varied or re-sequenced according to alternative embodiments. Other substitutions, modifications, changes, and omissions may be made in the design, operating conditions and arrangement of the exemplary embodiments without departing from the broad scope of the inventive concepts disclosed herein.

What is claimed is:

1. A system comprising:
   a receiver configured to receive a plurality of radio frequency (RF) signals from a transmitter, each RF signal incorporating a respective nominal carrier component; and
   circuitry configured to:
      remove from each received RF signal the respective nominal carrier component to generate a respective baseband signal;
      generate, for each baseband signal, a respective correlation signal using the baseband signal and a reference signal;
      incorporate to each correlation signal the respective nominal carrier component of the RF signal associated with that correlation signal, to generate a respective single-carrier correlation signal;
      aggregate the single-carrier correlation signals to generate a multi-carrier correlation signal; and
      determine one or more attributes of the transmitter or the received RF signals based on the generated multi-carrier correlation signal.

2. The system of claim 1, wherein the one or more attributes include at least one of:
   a time of arrival associated with the received RF signals; or
   an angle of arrival associated with the received RF signals.

3. The system of claim 1, wherein the circuitry is configured to downsample the generated baseband signals.

4. The system of claim 1, wherein the circuitry is configured to upsample the generated correlation signals.

5. The system of claim 1, wherein the circuitry is configured to:
   remove, from each received RF signal of the plurality of RF signals, the respective nominal carrier component by frequency-mixing the received RF signal with a RF oscillation signal to generate the respective baseband signal; and
   incorporate the respective nominal carrier component for each received RF signal by frequency-mixing the correlation signal associated with the received RF signal with a delayed version of the RF oscillation signal.

6. The system of claim 1, wherein the circuitry is configured to:
   generate a plurality of frequency shifted versions of each of the single-carrier correlation signals; and
   generate a plurality of multi-carrier correlation signals based on the plurality of frequency shifted versions of each of the single-carrier correlation signals.

7. The system of claim 1, wherein the RF signals include orthogonal frequency division multiplexing (OFDM) signals.

8. The system of claim 1, wherein the RF signals include frequency hopping spread spectrum (FHSS) signals.

9. The system of claim 8, wherein the circuitry is configured to time shift the generated correlation signals based on time delays between respective FHSS signals.

10. The system of claim 1, further comprising one or more RF oscillators for generating RF oscillation signals, the RF oscillation signals used by the circuitry to remove the nominal carrier components from the received RF signals, or used by the circuitry to incorporate the nominal carrier components to the generated correlation signals.

11. A method comprising:
- receiving, by a processing circuitry, a plurality of radio frequency (RF) signals from a transmitter, each RF signal incorporating a respective nominal carrier component;
- removing, by the processing circuitry, from each received RF signal the respective nominal carrier component to generate a respective baseband signal;
- generating, by the processing circuitry, for each baseband signal, a respective correlation signal using the baseband signal and a reference signal;
- incorporating, by the processing circuitry, to each correlation signal, the respective nominal carrier component of the RF signal associated with that correlation signal to generate a respective single-carrier correlation signal;
- aggregating, by the processing circuitry, the single-carrier correlation signals to generate a multi-carrier correlation signal; and
- determining, by the processing circuitry, one or more attributes of the transmitter or the received RF signals based on the generated multi-carrier correlation signal.

12. The method of claim 11, wherein the one or more attributes include at least one of:
- a time of arrival associated with the received RF signals; or
- an angle of arrival associated with the received RF signals.

13. The method of claim 11 further comprising:
- downsampling, by the processing circuitry, the generated baseband signals.

14. The method of claim 11 further comprising:
- upsampling, by the processing circuitry, the generated correlation signals.

15. The method of claim 11 further comprising:
- removing, by the processing circuitry, from each received RF signal of the plurality of RF signals, the respective nominal carrier component by frequency-mixing the received RF signal with a RF oscillation signal to generate the respective baseband signal; and
- incorporating, by the processing circuitry, the respective nominal carrier component for each received RF signal by frequency-mixing the correlation signal associated with the received RF signal with a delayed version of the RF oscillation signal.

16. The method of claim 11, wherein generating the multi-carrier correlation signal includes:
- generating, by the processing circuitry, a plurality of frequency shifted versions of each of the single-carrier correlation signals; and
- generating, by the processing circuitry, a plurality of multi-carrier correlation signals based on the plurality of frequency shifted versions of each of the single-carrier correlation signals.

17. The method of claim 11, wherein the RF signals include orthogonal frequency division multiplexing (OFDM) signals.

18. The method of claim 11, wherein the RF signals include frequency hopping spread spectrum (FHSS) signals.

19. The method of claim 18 further comprising:
- time shifting, by the processing circuitry, the generated correlation signals based on time delays between respective FHSS signals.

20. A non-transitory computer-readable medium including computer code instructions stored thereon, the computer code instructions, when executed by one or more processors, cause the one or more processors to:
- obtain a plurality of radio frequency (RF) signals received from a transmitter, each RF signal incorporating a respective nominal carrier component;
- remove from each received RF signal the respective nominal carrier component to generate a respective baseband signal;
- generate, for each baseband signal, a respective correlation signal using the baseband signal and a reference signal;
- incorporate, to each correlation signal, the respective nominal carrier component of the RF signal associated with that correlation signal to generate a respective single-carrier correlation signal;
- aggregate the single-carrier correlation signals to generate a multi-carrier correlation signal; and
- determine one or more attributes of the transmitter or the received RF signals based on the generated multi-carrier correlation signal.

* * * * *